Dec. 19, 1939.    J. H. SINCLAIR    2,183,700
BRAKING INDICATOR
Filed Jan. 26, 1933    2 Sheets-Sheet 1

JESSE H. SINCLAIR, Inventor
By H. H. Snelling
Attorney

Dec. 19, 1939.  J. H. SINCLAIR  2,183,700
BRAKING INDICATOR
Filed Jan. 26, 1933  2 Sheets-Sheet 2
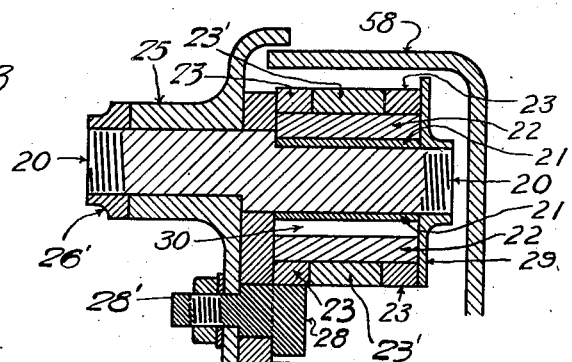
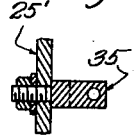
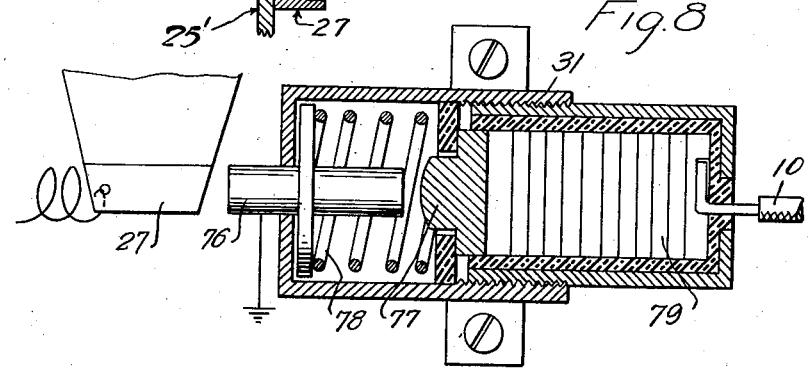
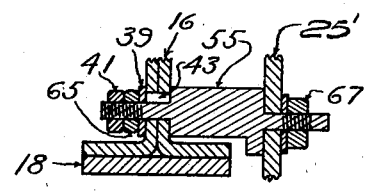
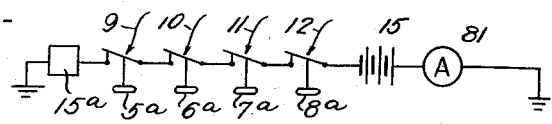
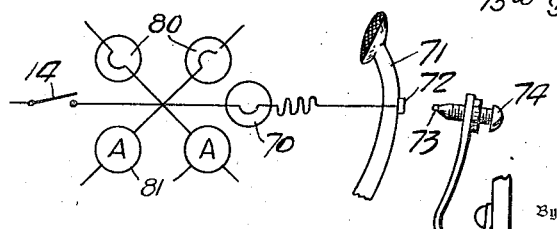
JESSE H. SINCLAIR  Inventor
Attorney

Patented Dec. 19, 1939

2,183,700

UNITED STATES PATENT OFFICE 2,183,700

BRAKING INDICATOR

Jesse H. Sinclair, Burlington, Vt.

Application January 26, 1933, Serial No. 653,739

11 Claims. (Cl. 73—51)

This invention relates to brake testing and more particularly to testing means for external contracting and internal expanding vehicle brakes.

The main object of the invention is to provide a testing device which measures positively and directly the braking force exerted by the brake shoes of an automobile.

Another object is to provide testing means which may be installed in existing brakes with a minimum amount of time and at a small cost.

Still another object of the invention is to provide an indicator system for a number of brakes which indicates not only the braking force exerted by each brake but also indicates the point of movement of the brake pedal at which all or a certain part of the brakes should begin to exert a braking force.

At present there is no way for the driver of an automobile to know when one of his four brakes is shirking and throwing the whole braking job on the other three brakes. And for this reason it not infrequently occurs that a single faulty brake causes the other brakes to wear out much faster than they would if the entire set were properly adjusted. It also often happens that due to maladjustment a single brake carries all the braking load and this fault frequently causes serious accidents because, as is well known, the braking of a single wheel may throw the automobile into an uncontrollable skid. The general object of my invention is to overcome all of these faults and disadvantages and I accomplish this by means of my testing and indicating system which in the preferred embodiment is adapted to signal the driver whenever any one, two or more brakes fails to exert any braking force or fails to operate at a predetermined point of movement of the brake operating pedal or lever.

I accomplish the above objects by mounting one or more brake shoes of the internal expanding or external contracting automobile brake type on an eccentric pin with the eccentricity normal to the direction of the pull of the brake whereby any braking force tends to turn the pin. In order to measure this tendency to turn, which tendency has a known proportional relation to the actual braking force, but is substantially independent of the amount of force applied to the brake lever, I provide a lever on the pin and to the free end of the lever attach a spring which spring is provided with means for adjusting the tension or if desired the compression to any predetermined amount. In order that the amount of braking force be indicated to the driver I provide means operated by turning of the eccentric pin for closing an electric circuit which circuit includes a signalling means, preferably a lamp, on the instrument board, steering wheel or other point within signalling distance of the driver. An additional feature of my invention is to provide a further signalling means connected to be operated by movement of the brake operating lever and adjusted to indicate the point at which the brakes should begin to exert a braking force when the brakes are properly adjusted.

This invention may be carried out also by mounting the brake shoes on any kind of yielding means whereby the shoes move a limited distance in the same direction as the moving braked element for example, in an automobile wheel brake the shoes may be mounted on an annular plate which in turn is movably mounted adjacent the usual backing plate and is kept from moving by spring means of a chosen resistance which is held on the backing plate; a switch is located so as to be operated by movement of the annular plate due to a chosen braking force whereby a signal is operated whenever actual braking occurs.

In the drawings:

Figure 1 is a wiring diagram of my braking indicating system.

Figure 2 is an outside elevation of my invention installed in an internal expanding brake (the spindle and brake drum not being shown).

Figures 3, 4, and 5 are sectional views on lines 3—3, 4—4, and 5—5 respectively, of Figure 2.

Figure 6 is a diagram similar to Figure 1 but showing an additional signal connected to be operated by the brake lever.

Figure 7 is a modification of two of the members shown in Figure 3.

Figure 8 is a sectional view of the switch shown in Figure 2.

Figure 9 is a wiring diagram of a modification of the system shown in Figure 1.

My indicating system is shown in Figure 1 as applied to an automobile having wheels 1 to 4, each wheel being equipped with the customary braking device but provided with my indicator means and shown connected in circuit with four signalling means 5 to 8 respectively by conductors 9 to 12. Each of the signalling means, here shown as lamps, is adapted to be connected by means of conductor 13 and switch 14 with a source of electric current 15 which as is usual in most automobiles is grounded on one side, whereby upon operation of the testing device by any one brake, for example on wheel 1, a circuit is completed thru the corresponding signal which circuit may be traced thru conductor 9, lamp 5, switch 14, conductor 13, source 15 and from there back to the brake by way of the frame to which the source is grounded.

My invention as applied to a two-shoe brake of the present usual type is best illustrated in Figure 2, where shoes 16 and 17, provided with brake linings 18 and 19, are pivoted on eccentric pin or stud 20 which, although here shown as being at the top of the brake assembly, may be in any other position desired. Also the eccentricity may extend outwardly instead of inwardly as shown so long as the eccentricity is kept substantially radial with respect to the center of the brake unit and thus is normal to the braking force. I prefer this arrangement because by it a maximum torque is obtained with a minimum eccentricity. As best seen in Figure 3 on the inner end of pin 20 is provided a sleeve 21 which has a cylindrical bore but which has on the outside one or more plane surfaces, preferably four which make the sleeve rectangular in end elevation. This sleeve fits between two sides of the rectangular slot in a second sleeve 22 which in turn is journaled in the brake shoe ends or hubs 23 welded or otherwise secured to the web 16, the hub 23' of the other shoe being welded to or otherwise substantially integral with web 17. One of the brake shoe hubs is free to turn on the sleeve 22 but the other is keyed thereto as at 24. The eccentric pin 20 is pivoted in boss 25 which is welded or otherwise securely fastened to the usual backing plate 25' and the pin is held in position by nut 26'. The construction of this knuckle joint may be simplified by making sleeve 21 integral with pin 20 (see Figure 7) and this allows the discarding of key 24.

Between the two cylindrical ends of pin 20 and against the backing plate 25' is located the arm 27 which preferably but not necessarily extends radially inward and is provided with a transverse slot near the lower end thru which extends the stud 28; the shape of the slot permits the arm to swing over a limited arc for a purpose that will be pointed out below. The arm 27 has a drive fit engagement with or is otherwise secured to the central section of pin 20 which is shown as being rectangular but which may be of any non-circular shape as long as the co-operating surfaces prevent relative turning of the arm on the pin 20. The above mentioned sleeves and the brake shoes are held in assembled relation on the pin 20 by any desired means, for example, a wide flanged nut 29 may be used. Between the sleeve 21 and the lower wall of the sleeve 22 is a space 30 which is preferably as deep as the thickness of new brake lining so as to allow for adjustment of the brakes as the linings become worn. The adjusting or tightening is done by turning the stud 28 by means of a tool applied to the outer squared or flattened end 28', the lock nut having first been loosened. The stud is provided on the free inner end with a cam located to engage the lower side of the shoe hub 23 as the stud 28 is turned in one direction or the other. It will be seen that due to the space 30 the shoes can be moved closer to the brake drum without in any way binding or turning the pin 20 which turning would tend to throw the brake shoes out of line.

Located in the path of movement of the lower end of arm 27 (see Figs. 2 and 8) is a switch 31 of any well known preferably waterproof type having a grounded contact 76 and also an insulated contact 77 which are normally held out of engagement by some resilient means. The insulated contact is connected to one of the previously mentioned conductors for example, 10, so that when the arm 27 is moved against the switch the conductor 10 is grounded but as soon as the arm moves away the circuit is immediately opened by said resilient means 78. Movement of the arm caused by the braking force is resisted by spring 32 connected by an adjustable eye bolt 33 to a stud 35 mounted in the backing plate 25' and as will be seen the spring is adapted to be given any desired tension by the proper shifting of lock nuts 34 and 36. The stud 35 (Figure 4) is adapted to be locked in position by the usual lock washers and lock nuts. It may be desirable to use a compression spring instead of the tension type shown and it may be feasible to incorporate the switch 31 in the spring mechanism whether of the tension or of the compression type.

The lower part of the brake mechanism is provided as shown so that the brake shoes will not be held in a fixed position by the applying mechanism, but sufficient movement will be allowed to put the full braking load on the eccentric pin 20. In the well known construction shown the two shoes are retracted out of braking position partly by gravity but mainly by spring 37 and are guided in their movement by washers 38—39 and nuts 40 and 41, and slots 42 and 43. The links 44 and 45 of a toggle type brake applying mechanism are pivoted respectively to the webs 17 and 16 by pins 46 and 47 which are secured in place by cotters 48 and 49. The straightening force is applied to the toggle thru a link 50 pivoted to one end of a bell crank arm 51 by pin 52 and connected to the links 44 and 45 by the pin 52'; the other arm 53 of the bell crank, shown in dotted lines as on the opposite side of the backing plate, is connected to the brake actuating means (not shown). As best shown in Figure 5 the guide pins or studs 54 and 55 are eccentrically mounted in plate 25' so as to provide additional points of adjustment for the brake shoes 16 and 17, it being clear that the effect of turning these studs is to draw the guiding portion radially inward or outward whereby the entire braking surface of the shoe may be brought into engagement with the drum 58 at all stages of wear of the linings 18 and 19. The studs 54 and 55 may be locked in any desired radial position by nuts 67 and are provided with flattened ends to facilitate adjustment. To prevent the washers 38 and 39 from coming loose or binding against the webs 16 and 17 I provide a nut 65 locked by nut 41. As appears in Figure 5 the slots 42 and 43 are made sufficiently wide to allow the necessary radial movement of the brake shoes as they are operated into engagement with the drum by the straightening of the toggle joint.

In Figure 6 I have illustrated a system similar to that shown in Figure 1 but with an additional signal 70 adapted to be operated by movement of the brake pedal or operating lever 71. It will be seen that the circuit thru signal 70 will be closed when the brake pedal carries contact 72 against contact 73, altho shown on pedal 71 it is obvious that the contact 72 may be carried on any part of the brake actuating means. I prefer that the engagement of the contacts occur at the time the front wheel brakes should actually begin to produce a braking effect and for this reason one (or both) of the contacts is made adjustable, for example contact 73 may be carried on an adjustable screw 74 locked into the end of a leaf spring 75 which of course, is grounded to complete the circuit; it is preferable that the switch be waterproof and the parts must be properly insulated. However, any of the well known types of adjustable contact brake operated switches may be used. When the brakes and brake rods are properly adjusted all the lights should go on simultaneously and if any light fails to burn it indicates that some adjustment of the corresponding brake or brake rod is necessary.

The braking load may be distributed among the four wheels in any desired proportion without affecting the indicator system because the tension of the springs 32 may be changed to balance any desired pull on the brake shoes.

Still another embodiment of my invention is the provision of electrical measuring devices 81 to be substituted for the signalling means 80 and also as shown in Figure 8 an electrical device 79 for the switch 31 which device varies the current or voltage in response to changing pressure applied by the arm 27 whereby the braking force of any brake shoe may be read directly on the measuring devices 81. I find that a device for varying the current in response to changing braking force is most satisfactory and economical since it is possible to use for the measuring device one of the ammeters usually found on the dash by providing the proper switching arrangement. Such an arrangement is shown in Figure 9 in which the four lights 5, 6, 7 and 8 are replaced by four two-way switches 5ª, 6ª, 7ª and 8ª which are normally connected in series with each other and with the usual load 15ª such as the ignition, driving lights, gasoline gauge or the like. When the driver wishes to test a brake, for example, that on the rear right wheel 2, he pushes the switch 6ª against the terminal of conductor 10. This operation cuts the load 15ª out of circuit and cuts carbon-pile switch 31 in circuit and a pressure on the brake pedal will cause a current to flow through the ammeter 81 in proportion to the amount of braking force exerted by the brake on wheel 2. The testing of the other brakes is accomplished in the same manner by operating the respective switches 5ª, 7ª and 8ª. I also find that the ordinary lamp will give a rough indication of the changing braking force when a pressure responsive current regulator, for example, a resistance, is substituted for switch 31 because at low braking forces the lamp glows but dimly but as the force increases it grows brighter until it reaches a normal maximum; thus the wear on any one brake may be known at any time for as wear occurs the lamp or lamps grow correspondingly dimmer.

It is clear that my indicator will show a failure of the operation of the brakes regardless of the reason for the failure; whether due to oil or water in the brake, worn linings, maladjustment or even to skidding of a wheel the failure of operation is signalled to the driver.

From the above it will be seen that I have invented an indicator which measures the actual braking force and is so simple that it may be built into new cars with only slight changes in the car design or it may be installed in any existing internal expanding or external contracting brake of the type now universally used on automobiles and with very few changes and at slight expense. One simple change is the substitution of my eccentric stud 20 with its arm 27 for the usual shoe pivoting stud; in order to provide sufficient bearing surface it may be necessary to weld or otherwise secure a boss 25 to the backing plate. The operating mechanism may have to be changed to allow the slight motion necessary to put the entire braking load on the pin 20. The mounting of the switch and spring require but a few minutes and are simple operations which may be performed by any mechanic, and the same is true of the installation of the signals and wiring system.

Although I have illustrated my invention as applied to only one type of brake it is to be understood that it works equally well on other types as long as some arrangement is made to translate the actual braking force into a limited motion independent of the amount of pressure exerted by the shoe on the braking surface. For example if oil or grease happens to get between the shoe and surface of a newly adjusted brake a relatively great pressure on the shoe will exert practically no actual braking force, and under these conditions a true indicator such as I have described will show zero. One type of brake now found in some makes of cars has two or more shoes linked together but only one of the shoes being pivoted to the backing plate and the shoe at the other end of the links having means for receiving the braking pressure; in this type, just as in that described above, it is only necessary to provide means for throwing the entire braking load on the pivoting pin as previously described and then modify and arrange the pivoting pin so that it moves either angularly or laterally a limited distance in response to this braking load, and in so moving operates a signal or measuring device on the instrument board.

What I claim is:

1. In a brake mechanism, a brake shoe, a pivoting hub on said shoe, a pin for supporting said shoe, a sleeve journaled in said hub and mounted on said pin for lateral movement with respect thereto, said pin and sleeve having non-cylindrical cooperating surfaces for preventing relative turning, whereby said shoe has pivotal and lateral motion with respect to said pin.

2. The device of claim 1 in which said pin is pivoted on an axis offset from its main axis, said offset being in a direction normal to the braking surface of the shoe whereby braking action of the shoe causes the pin to turn on its pivotal axis, means for resisting said turning and means actuated by said turning pin to operate a signal.

3. In a brake mechanism, a brake shoe, a supporting pin for said shoe, a pivoting hub on said shoe, a sleeve journaled in said hub and having non-rotative engagement with said pin to prevent relative turning of the sleeve and pin, the inner transverse dimension of the sleeve on one diameter being greater than the corresponding dimension of said pin to thereby permit lateral relative movement between the sleeve and pin.

4. In a device for measuring the movement of a brake shoe due to its braking force, comprising an eccentric pin for mounting the shoe in braking position, the eccentricity of said pin being substantially normal to the direction of the braking force whereby said force tends to turn the pin, means for resisting the turning of the pin with a predetermined force and means for indicating the resultant turning of the pin.

5. In an internal expanding brake having a backing plate, an eccentric pin pivoted in said plate, a plurality of arcuate brake shoes pivoted on said pin, the eccentricity of said pin being radial with respect to said shoes whereby braking force exerted by said shoes tends to turn the pin, an arm connected to be moved by said pin, said arm being on the same side of the backing plate as the brake shoes, and a signalling means in the path of said arm whereby any braking force set up by said shoes operates said signalling means.

6. In a braking indicator for internal expanding brakes having a plurality of arcuate brake shoes, means for moving said shoes to braking position, a backing plate for supporting said shoes and said moving means, a short crank pivoted in said plate and being radial with respect to said shoes, a crank pin on the free end of said crank, said shoes being connected to said pin whereby a braking force tending to move said shoes causes movement of the crank, an arm connected to be turned by said crank, adjustable yielding means connected to resist said turning, a switch located adjacent said arm, and a signalling circuit adapted to be closed by said switch whereby a signal may be operated at any predetermined braking load on said shoes.

7. The device of claim 6 in which the connection of the shoes to the pin allows radial movement of the brakes without producing any torque on said crank.

8. A braking indicator system comprising an arcuate brake shoe mounted for motion toward its braking surface and for motion in a direction parallel to said surface, a switch, means responsive to the last mentioned movement of the shoe for operating said switch, said means being independent of the first mentioned motion, said means comprising a crank which is substantially radial with respect to the center of curvature of said brake, said crank being supported in a fixed pivot and having a crank pin engaging said shoe in an elongated slot to permit said shoe to move radially without turning said crank, whereby said switch is operated only when the brake shoe exerts a braking force on the braking surface and is not operated upon mere pressure of the shoe against the surface.

9. A device for measuring the braking effect of a brake shoe comprising an eccentric pin for supporting the shoe in braking position whereby the shoe tends to move in a direction contra to the direction of the braking force, a crank arm secured to the pin, spring means connecting the free end of the arm to a relatively fixed point and tensioned to resist with a predetermined force the movement of the shoe in said contra direction, and means for measuring the resultant movement whereby the pull on the brake shoe may be determined.

10. A device for measuring the braking effect of a brake shoe comprising an eccentric pin for supporting the shoe in braking position whereby the shoe tends to move in a direction contra to the direction of the braking force, a crank arm secured to the pin, spring means connecting the free end of the arm to a relatively fixed point and tensioned to resist with a predetermined force the movement of the shoe in said contra direction, means for measuring the resultant movement whereby the pull on the brake shoe may be determined, and means for adjusting the resisting force of the spring means.

11. In an automobile brake a backing plate for supporting a brake shoe, said plate adapted to cooperate with a brake drum to form a substantially closed housing, a brake shoe supporting pin eccentrically journalled in said plate, a brake shoe within the housing and pivotally carried by said pin, the eccentricity of the pin being substantially radial with respect to said plate whereby braking action of the shoe tends to turn the pin, means for resisting the turning of the pin and a switch mounted on the plate within the housing for operation by said turning of the pin.

JESSE H. SINCLAIR.